US012707474B2

(12) United States Patent
Zhang et al.

(10) Patent No.: US 12,707,474 B2
(45) Date of Patent: Aug. 11, 2026

(54) METHOD AND SYSTEM FOR SINGLE CG-BASED UPLINK TRANSMISSION IN MULTI-TRP OPERATION

(71) Applicant: ZTE CORPORATION, Guangdong (CN)

(72) Inventors: Yang Zhang, Shenzhen (CN); Chuangxin Jiang, Shenzhen (CN); Shujuan Zhang, Shenzhen (CN); Hao Wu, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 260 days.

(21) Appl. No.: 18/207,390

(22) Filed: Jun. 8, 2023

(65) Prior Publication Data

US 2023/0319840 A1 Oct. 5, 2023

Related U.S. Application Data

(63) Continuation of application No. PCT/CN2021/085294, filed on Apr. 2, 2021.

(51) Int. Cl.
*H04W 72/231* (2023.01)
*H04W 72/1268* (2023.01)

(52) U.S. Cl.
CPC ..... *H04W 72/231* (2023.01); *H04W 72/1268* (2013.01)

(58) Field of Classification Search
CPC ........................ H04W 72/231; H04W 72/1268
See application file for complete search history.

(56) References Cited

U.S. PATENT DOCUMENTS

2019/0349964 A1* 11/2019 Liou .................. H04W 72/046
2020/0107353 A1* 4/2020 Jung .................... H04W 72/23
(Continued)

FOREIGN PATENT DOCUMENTS

CN 111656842 A 9/2020
CN 112534892 A 3/2021
(Continued)

OTHER PUBLICATIONS

Apple Inc., "On Multi-TRP Reliability Enhancement," 3GPP TSG-RAN WG1 Meeting #104-e, R1-2101351, e-Meeting, Jan. 25, 2021 (12 pages).
(Continued)

*Primary Examiner* — Jael M Ulysse
(74) *Attorney, Agent, or Firm* — Foley & Lardner LLP

(57) ABSTRACT

Example implementations include a method of receiving, by a wireless communication device from a wireless communication node, a downlink signalling indicating a single Configured Grant (CG) for uplink transmission, where the downlink signalling comprises a plurality of first parameters, each first parameter having a plurality of values associated with a plurality of Sounding Reference Signal (SRS) resource sets, respectively. Example implementations also include a method of sending, by a wireless communication node to a wireless communication device, a downlink signalling indicating a single Configured Grant (CG) for uplink transmission, where the downlink signalling comprises a plurality of first parameters, each first parameter having a plurality of values associated with a plurality of Sounding Reference Signal (SRS) resource sets, respectively.

20 Claims, 11 Drawing Sheets

(56) References Cited

U.S. PATENT DOCUMENTS

| | | | | |
|---|---|---|---|---|
| 2020/0229104 | A1* | 7/2020 | MolavianJazi | H04W 52/54 |
| 2022/0232482 | A1* | 7/2022 | Matsumura | H04L 5/0048 |
| 2022/0361230 | A1* | 11/2022 | Ying | H04W 72/23 |
| 2022/0369242 | A1* | 11/2022 | Matsumura | H04W 52/325 |
| 2023/0396373 | A1* | 12/2023 | Gao | H04L 1/1861 |
| 2024/0056986 | A1* | 2/2024 | Jeon | H04W 52/365 |
| 2024/0155502 | A1* | 5/2024 | Lin | H04W 52/36 |
| 2024/0259950 | A1* | 8/2024 | Nilsson | H04W 52/42 |

FOREIGN PATENT DOCUMENTS

| | | |
|---|---|---|
| CN | 112585879 A | 3/2021 |
| WO | WO-2020/165413 A1 | 8/2020 |
| WO | WO-2021/030674 A1 | 2/2021 |
| WO | WO-2021/031301 A1 | 2/2021 |

OTHER PUBLICATIONS

Catt, "Enhancements on multi-TRP/panel for PDCCH, PUCCH and PUSCH," 3GPP TSG RAN WG1 Meeting #104-e, R1-2100344, e-Meeting, Jan. 25, 2021 (17 pages).

Ericsson, "On PDCCH, PUCCH and PUSCH enhancements," 3GPP TSG-RAN WG1 Meeting #104e, R1-2101654, e-Meeting, Jan. 25, 2021 (24 pages).

Huawei, et al., "Enhancements on multi-TRP for reliability and robustness in Rel-17," 3GPP TSG RAN WG1 Meeting #104-e, R1-2100209, e-Meeting, Jan. 25, 2021 (14 pages).

International Search Report and Written Opinion for PCT Appl. No. PCT/CN2021/085294, mailed Jan. 4, 2022 (8 pages).

Nokia, et al., "Enhancements for Multi-TRP URLLC schemes," 3GPP TSG RAN WG1 #104-e Meeting, R1-2101006, e-Meeting, Jan. 25, 2021 (22 pages).

NTT DOCOMO, Inc., "Discussion on MTRP for reliability," 3GPP TSG RAN WG1 #104-e, R1-2101598, e-Meeting, Jan. 25, 2021 (15 pages).

Qualcomm Inc., "Enhancements on Multi-TRP for PDCCH, PUCCH and PUSCH," 3GPP TSG-RAN WG1 Meeting #104-e, R1-2101447, Feb. 5, 2021, e-Meeting (28 pages).

Qualcomm Incorporated, "Enhancements on Multi-TRP for PDCCH, PUCCH and PUSCH," 3GPP TSG-RAN WG1 Meeting #104-e, R1-2101447, e-Meeting, Jan. 25, 2021 (28 pages).

Vivo, "Enhancements on Multi-TRP for PDCCH, PUCCH and PUSCH," 3GPP TSG RAN WG1 #104-e, R1-2100422, e-Meeting, Jan. 25, 2021 (28 pages).

Vivo: "Further discussion on enhancement of MTRP operation" 3GPP TSG RAN WG1 #103-e; R1-2007645; Nov. 13, 2020; e-Meeting (15 pages).

Zte, "Enhancements on Multi-TRP for PDCCH, PUCCH and PUSCH," 3GPP TSG RAN WG1 Meeting #104-e, R1-2100286, e-Meeting, Jan. 25, 2021 (25 pages).

Ericsson, "On PDCCH, PUCCH and PUSCH enhancements with multiple TRPs", 3GPP Draft; R1-2009223, 3GPP TSG-RAN WG1, e-Meeting #103, Nov. 1, 2020 (25 pages).

Extended European Search Report on EP Appl No. 21934079.1, dated Dec. 4, 2023 (7 pages).

Fraunhofer Iis et al., "On multi-TRP enhancements for PDCCH and PUSCH", 3GPP Draft; R1-2100535, 3GPP TSG-RAN WG1, e-Meeting #104e, Jan. 18, 2021 (13 pages).

Notification to Go through Formalities of Registration and Notification to Grant Patent Right for Invention with Search Report on Chinese Patent Application No. 202311626930.3, dated Jan. 7, 2025 (8 pages, including English translation).

First Office Action for CN Appl. No. 202311626930.3, dated May 8, 2024 (with English translation, 18 pages).

Communication pursuant to Article 94(3) EPC for EP Appl. No. 21934079.1, dated Sep. 2, 2025 (4 pages).

Office Action for CA Appl. No. 3,205,002 dated Nov. 3, 2025 (4 pages).

3rd Generation Partnership Project; Technical Specification Group Radio Access Network; NR; Radio Resource Control (RRC) protocol specification (Release 16), 3GPP TS 38.331 V16.4.1 (Mar. 2021), 953 pages.

Office Action for KR Appl. No. 10-2023-7020201, dated Jul. 16, 2025 (with English translation, 6 pages).

Vivo, "Further discussion on multi beam enhancement", 3GPP TSG RAN WG1 #104-e, R1-2100421, Feb. 5, 2021, e-Meeting (29 pages).

* cited by examiner

Figure 8:
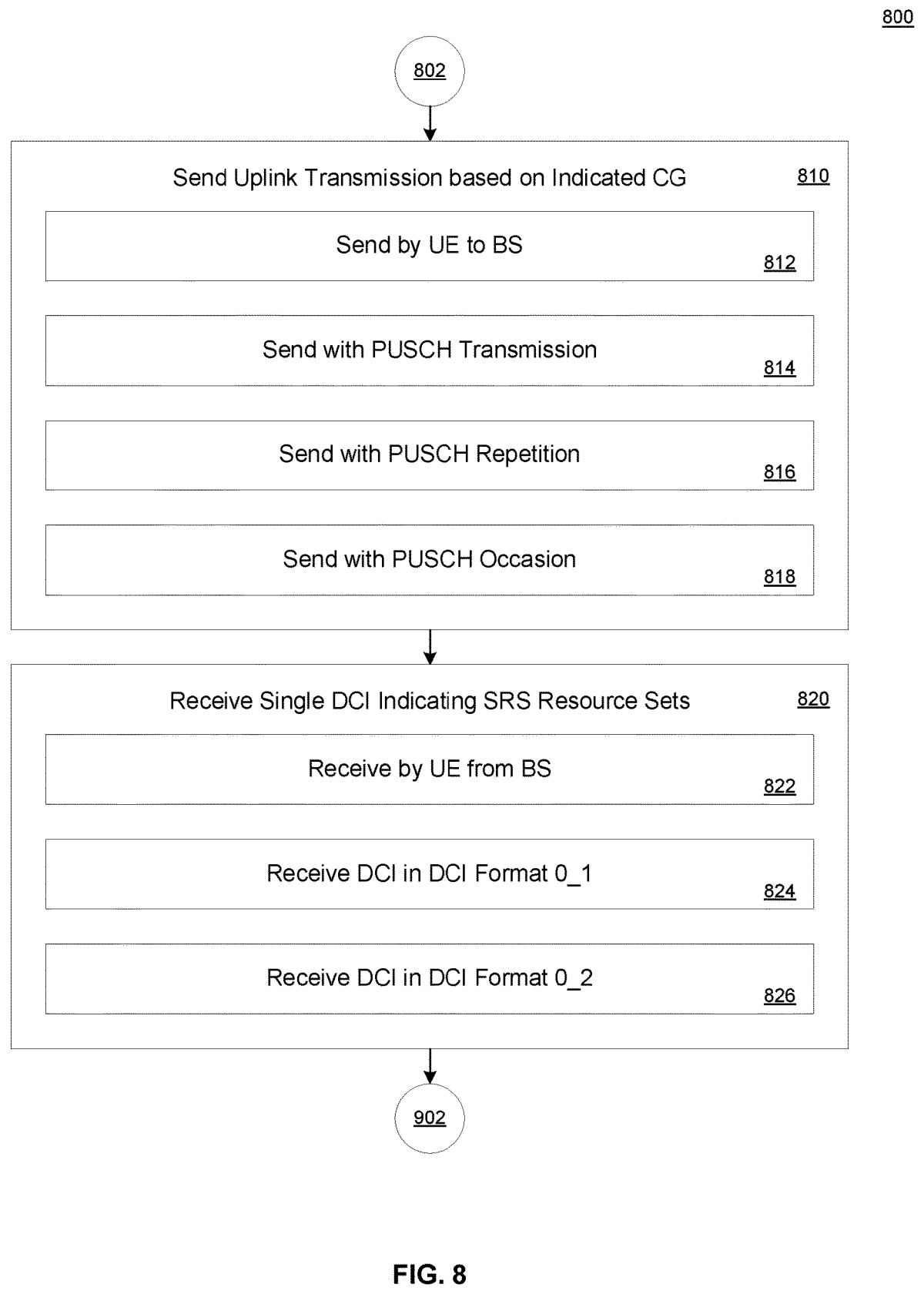

800

802

Send Uplink Transmission based on Indicated CG 810

Send by UE to BS 812

Send with PUSCH Transmission 814

Send with PUSCH Repetition 816

Send with PUSCH Occasion 818

Receive Single DCI Indicating SRS Resource Sets 820

Receive by UE from BS 822

Receive DCI in DCI Format 0_1 824

Receive DCI in DCI Format 0_2 826

METHOD AND SYSTEM FOR SINGLE CG-BASED UPLINK TRANSMISSION IN MULTI-TRP OPERATION

CROSS-REFERENCE TO RELATED APPLICATION

This application claims the benefit of priority under 35 U.S.C. § 120 as a continuation of International Patent Application No. PCT/CN2021/085294, filed on Apr. 2, 2021, the disclosure of which is incorporated herein by reference in its entirety.

TECHNICAL FIELD

The present implementations relate generally to wireless communications, and more particularly to single CG-based uplink transmission in multi-TRP operation.

BACKGROUND

Dynamic scheduling is the main mode of operation in 5G NR. For each transmission interval, for example, a slot, the scheduler uses control signalling to instruct the UE to transmit or receive. It is flexible and can adopt to rapid variations in the traffic behavior, but obviously requires associated control signalling. However, due to control signalling that in some situations it is desirable to avoid, NR therefore supports transmission schemes not relying on dynamic grants.

SUMMARY

In order to enable single CG based multi-TRP PUSCH transmission, is ad advantageous to address three issues, including which higher layer parameters of type 1 CG should be configured as TRP specific, which higher layer parameters of type 2 CG should be configured as TRP specific, the configuration or indication of the parameter as TRP specific for sequence generation of uplink transmission when in multi-TRP operation.

Example implementations include a wireless communication method of receiving, by a wireless communication device from a wireless communication node, a downlink signalling indicating a single Configured Grant (CG) for uplink transmission, wherein the downlink signalling comprises a plurality of first parameters, each first parameter having a plurality of values associated with a plurality of Sounding Reference Signal (SRS) resource sets, respectively.

Example implementations also include a method where the downlink signalling includes a Radio Resource Control (RRC) signalling.

Example implementations also include a method where in response to determining that the CG includes a Type 1 CG, the plurality of first parameters, in the downlink signalling, include at least one of an index of power control closed loop, an index of a higher layer parameter, P0-PUSCH-AlphaSet, an index of path loss reference signal, an indicator of one SRS resource per one of the SRS resource sets, an indicator of precoding information and a number of layers, a value of a higher layer parameter, dmrs-SeqInitialization, or a value of a higher layer parameter, antennaPort.

Example implementations also include a method of receiving, by the wireless communication device from the wireless communication node, a plurality of higher layer parameters in the downlink signalling, each of the higher layer parameters configuring an association between each of the SRS resource sets and one of the values of the first parameter.

Example implementations also include a method where the downlink signalling configures an association between each of the SRS resource sets and one of the values of the first parameter.

Example implementations also include a method where in response to determining that the CG includes a Type 2 CG, the plurality of first parameters, in the downlink signalling, include at least one of an index of power control closed loop, or an index of a higher layer parameter, P0-PUSCH-AlphaSet.

Example implementations also include a method of receiving, by the wireless communication device from the wireless communication node, a plurality of higher layer parameters in the downlink signalling, each of the higher layer parameters configuring an association between each of the SRS resource sets and one of the values of the first parameter.

Example implementations also include a method where the downlink signalling configures an association between each of the SRS resource sets and one of the values of the first parameter.

Example implementations also include a method of receiving, by the wireless communication device from the wireless communication node, a downlink control information (DCI) message, wherein the DCI message includes a plurality of second parameters, each second parameter having a plurality of values associated with the plurality of SRS resource sets, respectively, where the plurality of second parameters, in the DCI message, include at least one of an index of path loss reference signal, an indicator of one SRS resource per one of the SRS resource sets, an indicator of precoding information and a number of layers, a value of a higher layer parameter, dmrs-SeqInitialization, or a value of a higher layer parameter, antennaPort.

Example implementations also include a method of, in response to determining that a higher layer parameter in the downlink signalling is set as codebook, receiving, by the wireless communication device from the wireless communication node, the DCI message configuring an association between each of the SRS resource sets and one of the values of the second parameter, where each of the SRS resource sets is indicated by one or more SRS resource indicators (SRIs) or a transmitted precoding matrix indicators (TPMIs).

Example implementations also include a method of, in response to determining that a higher layer parameter in the downlink signalling is set as non-codebook, receiving, by the wireless communication device from the wireless communication node, the DCI message configuring an association between each of the SRS resource sets and one of the values of the second parameter, where each of the SRS resource sets is indicated by one or more SRIs.

Example implementations also include a method of sending, by the wireless communication device to the wireless communication node, uplink transmission based on the indicated single CG, where the uplink transmission includes at least one of: Physical Uplink Shared Channel (PUSCH) transmission, PUSCH repetition, or PUSCH occasion.

Example implementations also include a method of receiving, by the wireless communication device from the wireless communication node, a single downlink control information (DCI) message indicating the plurality of SRS resource sets, where the DCI message is at least one of a DCI format 0_1 or a DCI format 0_2.

Example implementations also include a method of receiving, by the wireless communication device from the wireless communication node, a command, wherein the command is configured to determine a plurality of uplink transmission parameters, each of the uplink transmission parameters having a plurality of values associated with the plurality of SRS resource sets, respectively.

Example implementations also include a method where the command is received through an RRC signalling, DCI indication, or MAC CE activation.

Example implementations also include a method where one of the uplink transmission parameters includes an identifier of a sequence configured to initialize data scrambling.

Example implementations also include a method of sending, by a wireless communication node to a wireless communication device, a downlink signalling indicating a single Configured Grant (CG) for uplink transmission, where the downlink signalling comprises a plurality of first parameters, each first parameter having a plurality of values associated with a plurality of Sounding Reference Signal (SRS) resource sets, respectively.

Example implementations also include an apparatus with at least one processor and a memory, where the at least one processor is configured to read code from the memory and implement a method according to present implementations.

Example implementations also include a computer program product with a computer-readable program medium code stored thereupon, the code, when executed by at least one processor, causing the at least one processor to implement a method according to present implementations.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 8 illustrates an example method of single CG-based uplink transmission in multi-TRP operation further to the example method of FIG. 7.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Figure 1:
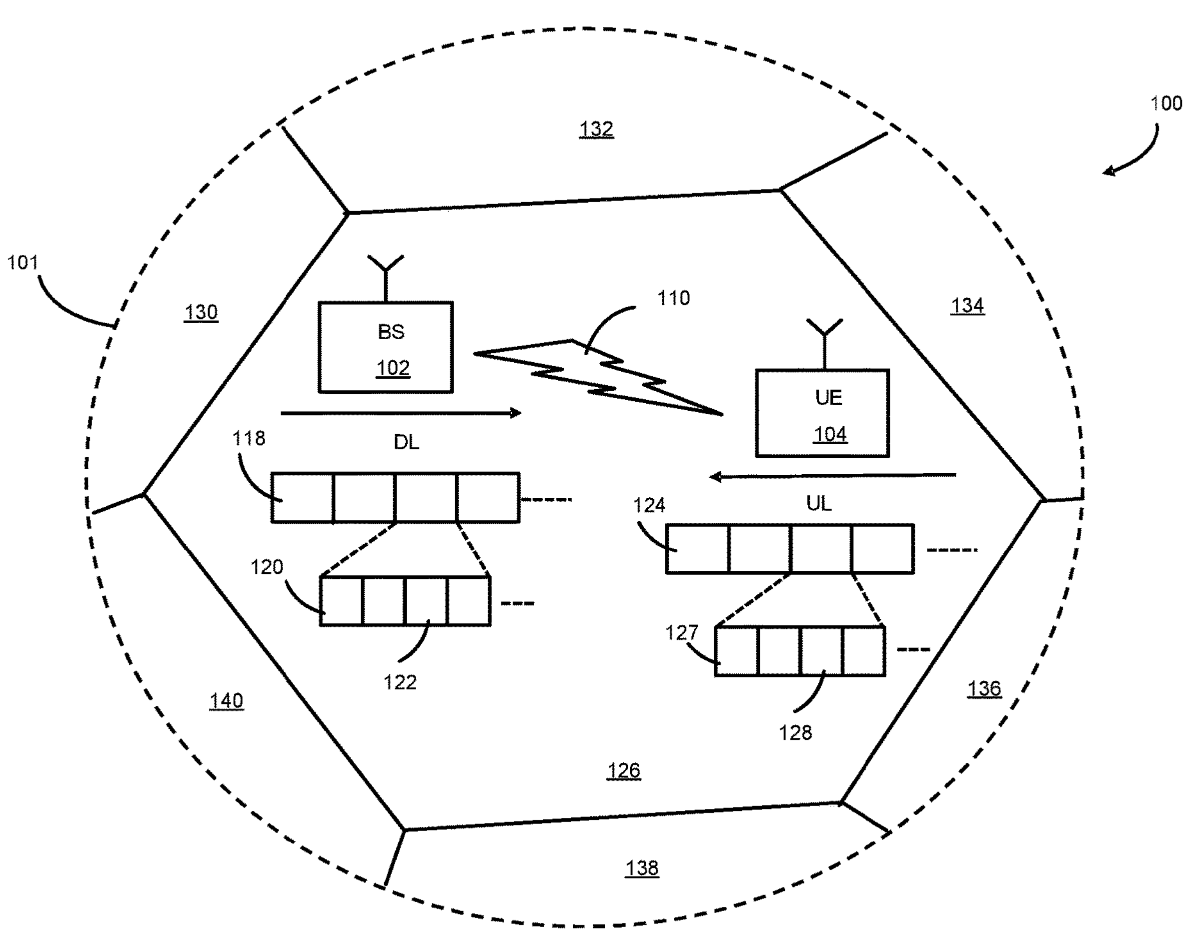
FIG. 1 illustrates an example cellular communication network in which techniques and other aspects disclosed herein may be implemented, in accordance with an implementation of the present disclosure.

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
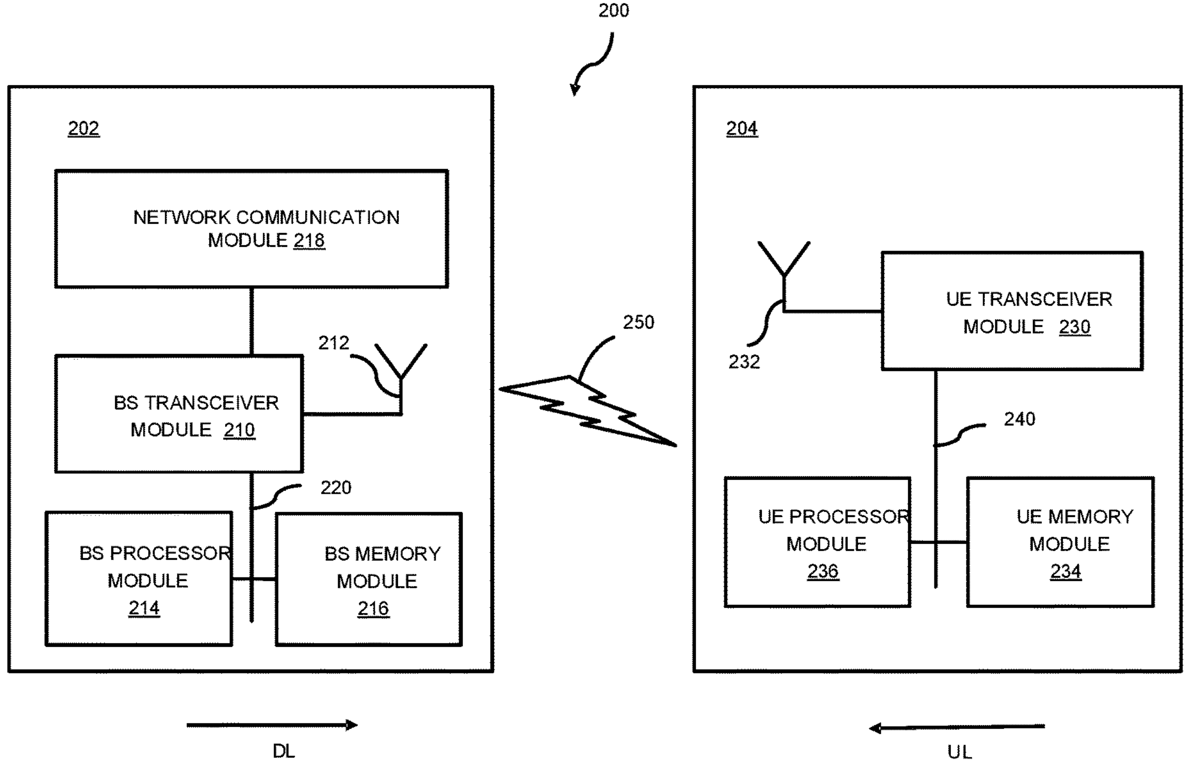
FIG. 2 illustrates block diagrams of an example base station and a user equipment device, in accordance with some implementations of the present disclosure.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 3:
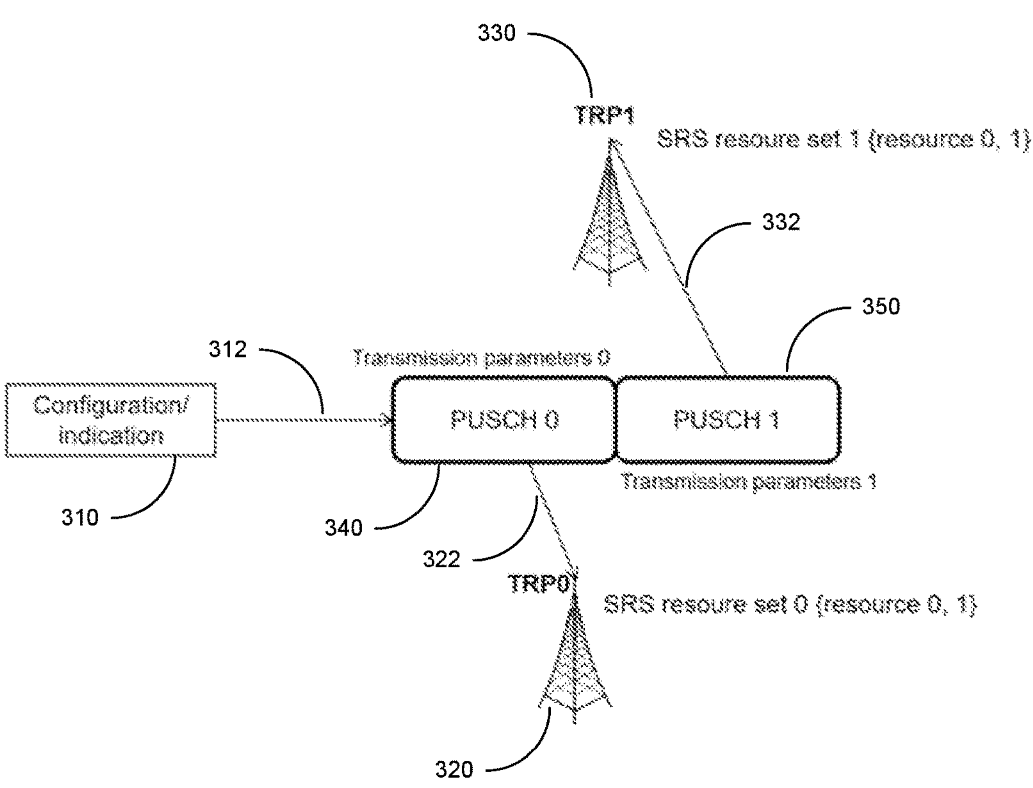
FIG. 3 illustrates a first example system, in accordance with present implementations.

FIG. 3 illustrates a first example system, in accordance with present implementations. As illustrated by way of example in FIG. 3, an example system 300 includes a configuration/indication 310, transmission parameters 312, TRP0 320, SRS resource set 322, TRP1 330, SRS resource set 1 332, PUSCH0 340, and PUSCH1 350.

As illustrated by way of example in FIG. 3, for Multi-TRP operation, due to different channel conditions of links between UE and multiple TRPs, some configured/indicated transmission parameters should be independent for each TRP, such as spatial relation, precoder, power control, etc. Correspondingly, some parameters in RRC configuration or DCI indication should be indicated respectively for each TRP to obtain better performance. Thus, it could be beneficial to indicate two indicated information instead of one.

In uplink, at least two schemes for transmission without a dynamic grant are supported, differing in the ways they are activated. These schemes include a Type 1 Configured grant, where an uplink grant is provided by RRC, including activation of the grant, and a Type 2 Configured grant, where the transmission periodicity is provided by RRC and L1/L2 control signalling is used to activate/deactivate the transmission.

Figures 4A, 4B:
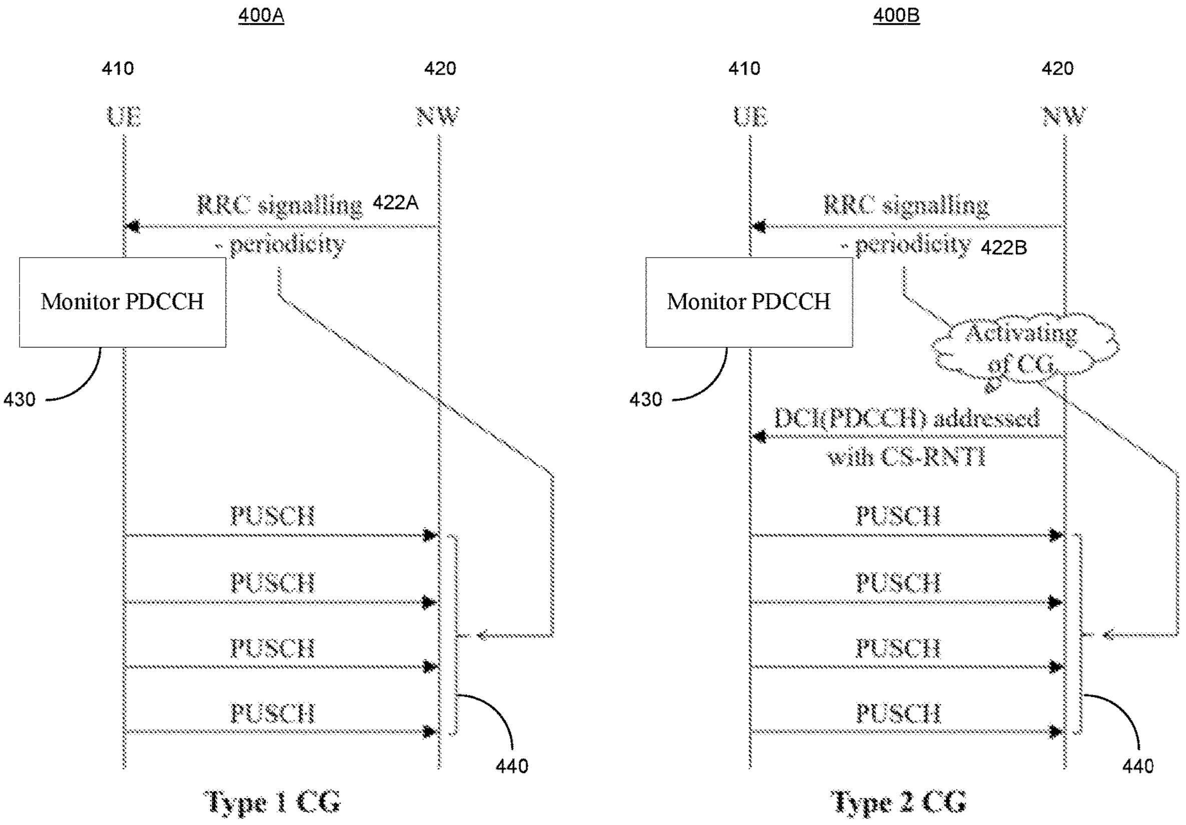
FIG. 4A illustrates a first example system for a first scheme for transmission, in accordance with present implementations.
FIG. 4B illustrates a second example system for a second scheme for transmission, in accordance with present implementations.

FIG. 4A illustrates a first example system for a first scheme for transmission, in accordance with present implementations. As illustrated by way of example in FIG. 4A, an example system 400A includes UE 410, NW 420, RRC signalling 422A, a monitor PDCCH a430 and a plurality of PUSCH 440.

Type 1 sets all the transmission parameters, including periodicity, time offset, and frequency resources as well as modulation-and-coding scheme of possible uplink transmissions, using RRC signalling. Upon receiving the RRC configuration, the UE can start to use the configured grant for transmission in the time instant given by the periodicity and offset. RRC configurations take effect as soon as they are received correctly. This point in time may vary as it depends on whether RLC retransmissions were needed to deliver the RRC command or not. To avoid this ambiguity, a time offset relative to the SFN is included in the configuration.

FIG. 4B illustrates a second example system for a second scheme for transmission, in accordance with present implementations. As illustrated by way of example in FIG. 4B, an example system 400B includes UE 410, NW 420, RRC signalling 422B, a monitor PDCCH a430 and a plurality of PUSCH 440.

Type 2 is similar to type 1, where RRC signalling is used to configure the periodicity, but the transmission parameters are provided as part of the activation using the PDCCH. Upon receiving the activation command, the UE transmits according to the preconfigured periodicity if there are data in the buffer. If there are no data to transmit, the UE will, similarly to type 1, not transmit anything. Note that no time offset is needed in this case as the activation time is well defined by the PDCCH transmission instant. The UE acknowledges the activation/deactivation of the configured grant type 2 by sending a MAC control element in the uplink. If there are no data awaiting transmission when the activation is received, the network would not know if the absence of transmission is due to the activation command not being received by the UE or if it is due to an empty transmission buffer. The acknowledgment helps in resolving this ambiguity.

In both these schemes it is possible to configure multiple UEs with overlapping time-frequency resources in the uplink. In this case it is up to the network to differentiate between transmissions from the different UEs.

Besides, in the current specifications of NR, the RRC IE ConfiguredGrantConfig is used to configure uplink transmission with configured grant according to type 1 or type 2. Wherein, the UE uses UL grant and parameters (such as time and frequency domain allocation, antenna port, DMRS sequence initialization, precoder, rank, SRI, MCS, frequency hopping offset, PL-RS index, SFN, etc.) configured by DCI addressed to CS-RNTI (Type2) when the field rrc-ConfiguredUplinkGrant is absent in ConfiguredGrantConfig.

In general, 5G NR includes a number of MIMO features that facilitate utilization of a large number of antenna elements at base station for both sub-6 GHz and over-6 GHz frequency bands, one of the MIMO features is that it supports for multi-TRP operation. The key point of this functionality is to collaborate with multiple TRPs to transmit data to the UE to improve transmission performance. As NR is in the process of commercialization, various aspects that require further enhancements can be identified from real deployment scenarios. For PUSCH reliability enhancement based on Multi-TRP operation, due to the scheme of single DCI and CG based Multi-TRP PUSCH transmission has a stable design framework, it has been agreed to study firstly in Rel-17 NR. Based on that, up to two one SRS resource sets can be configured with higher layer parameter usage in SRS-ResourceSet set to 'nonCodebook'. Correspondingly, two SRIs in one DCI filed can be used to for SRS resource indication of the two non-codebook based SRS resource sets respectively, and the transmission rank and the number of SRS port(s) should be same for each non-codebook based PUSCH transmission.

In some implementations, the first communication node receives RRC signalling from the second communication node. Based on that, the first communication node transmits uplink transmission(s) without dynamic grant based on the parameters configured by the RRC signalling only (type1), which received from the second communication node. In some implementations, the first communication node can be the UE, the second communication can be at least one of: the NW or the gNB. In some implementations, the uplink transmission can be transmitted in FR1 or FR2. In some implementations, the uplink transmission can be at least one of: PUSCH, PUCCH, or SRS. In some implementations, PUSCH can be at least one of: PUSCH transmission, PUSCH repetition, or PUSCH occasion. In some implementations, the PUSCH transmissions can be associated with SRS resources from two SRS resource sets which indicated in a single DCI. In some implementations, the single DCI can be DCI format 0_1 or DCI format 0_2.

In some implementations, PUSCH transmissions and it repetitions associated with two SRS resource sets can be at least one of allocated in two different time location and the same time location, allocated in two different frequency location and the same time location, and allocated in the same time and frequency location as well as related to two different CDM groups. In some implementations, some parameters in the RRC signalling can be configured with two values which associated with two SRS resource sets. In some implementations, the parameters with two values can be at least one of, the index of power control closed loop, the index of higher layer parameter P0-PUSCH-AlphaSet to be used for this configuration, the index of path loss reference signal, the indicator of SRS resource per SRS resource set, the indicator of precoding information and number of layers, the value of higher layer parameter dmrs-SeqInitialization, which is related to the initialization of DMRS sequence generation for the uplink transmission, where transform precoding is disabled. In some implementations, the value of higher layer parameter antennaPort is related to the initialization of DMRS sequence generation for the uplink transmission which transform precoding is enable.

In some implementations, the association between the parameters with two configured values and SRS resource sets can be configured by two fields of the higher layer parameters rrc-ConfiguredUplinkGrant are associated with or used for the two SRS resource sets, respectively. In some implementations, two fields of each parameter which are configured with two values are associated with or used for the two SRS resource sets, respectively.

In some implementations, the first communication node receives RRC signalling from the second communication node. Based on that, the first communication node transmits uplink transmission(s) without dynamic grant based on the parameters provided by RRC signalling and PDCCH (addressed to CS-RNTI) (type2), which is received from the second communication node.

In some implementations, the first communication node can be the UE, the second communication can be at least one of the NW and the gNB. In some implementations, the uplink transmission can be transmitted in FR1 or FR2. In some implementations, the uplink transmission can be at least one of: PUSCH, PUCCH, or SRS. In some implementations, PUSCH can be at least one of: PUSCH transmission, PUSCH repetition, or PUSCH occasion. In some implementations, the PUSCH transmissions can be associated with SRS resources from two SRS resource sets which indicated in a single DCI. In some implementations, the single DCI can be DCI format 0_1 with CRC scrambled by CS-RNTI or DCI format 0_2 with CRC scrambled by CS-RNTI.

In some implementations, PUSCH transmissions and it repetitions associated with two SRS resource sets can be at least one of allocated in two different time location and the same time location, allocated in two different frequency location and the same time location, an allocated in the same time and frequency location as well as related to two different CDM groups.

In some implementations, some parameters in the RRC signalling can be configured with two values which associated with two SRS resource sets. In some implementations, the parameters with two values can be at least one of the index of power control closed loop, and the index of higher layer parameter P0-PUSCH-AlphaSet to be used for this configuration. In some implementations, the association between the configured parameters with two values and SRS resource sets can be configured by two fields of the higher layer parameters rrc-ConfiguredUplinkGrant are associated with or used for the two SRS resource sets, respectively; or two fields of the parameters which configured with two values are associated with or used for the two SRS resource sets, respectively. In some implementations, some parameters in DCI field provided by PDCCH (addressed to CS-RNTI) can be configured with two values which associated with two SRS resource sets.

Wherein, the parameters with two values can be at least one of the indicator of SRS resource per SRS resource set, the indicator of precoding information and number of layers, the indicator of the DM-RS initialization field. In some implementations, the association between the indicated parameters and SRS resource sets can be configured by two fields of each parameter which indicated with two values are associated with or used for the two SRS resource sets, respectively.

In some implementations, the first communication node receives a command from the second communication node to determine the parameters of the PUSCH(s) associated with SRS resources from two SRS resource sets which indicated in a single DCI indication. In some implementations, the first communication node can be at least one of the UE, and the second communication node can be at least one of the NW or the gNB. In some implementations, the PUSCH can be transmitted by codebook based scheme or non-codebook based scheme. In some implementations, the PUSCH can be at least one of: PUSCH transmission, PUSCH repetition, or PUSCH occasion.

In some implementations, the PUSCH(s) corresponding to two spatial relationships can be at least one of multiple potential states. In some implementations, a first potential state is allocated in two different time location and the same time location, where the time location corresponding to each PUSCH can be a time slot, or where the time location corresponding to each PUSCH can be OFDM symbols in a time slot. In some implementations, a second potential state is allocated in two different frequency locations and the same time location. In some implementations, a third potential state is allocated in the same time and frequency location as well as related to two different CDM groups.

In some implementations, the parameter can be an identifier which used to initialize data scrambling (such as c_init) for the PUSCH(s) which associated with the two SRS resource sets. In some implementations, the association between the values of the identifier and the two SRS resource sets can be achieved by the first and the second values of the identifier are used to the first and the second SRS resource sets, respectively, or, the first and the second values of the identifier are associated with the indicators of first and the second SRS resource sets, respectively.

In some implementations, the indicator of SRS resource set can be SRI(s) indication or TPMI(s) indication in DCI when higher layer parameter txConfig in PUSCH-Config is set to ‘codebook’. In some implementations, the indicator of SRS resource set can be SRI(s) indication in DCI when higher layer parameter txConfig in PUSCH-Config is set to ‘nonCodebook’. In some implementations, the command determines the parameters can be at least one of: RRC signalling, MAC CE activation, or DCI indication.

In some implementations, the first communication node receives a command from the second communication node to determine the parameters of PUCCH(s), which are associated with two spatial relationships activated by MAC CE. In some implementations, the first communication node can be at least one of the UE, and the second communication node can be at least one of the NW or the gNB. In some implementations, the format of the PUCCH can be at least one of: PUCCH format 0, PUCCH format 1, PUCCH format 2, PUCCH format 3, or PUCCH format 4.

In some implementations, PUCCH can be at least one of: PUCCH transmission, PUCCH repetition, or PUCCH occasion. In some implementations, the PUCCH(s) corresponding to two spatial relationships can be allocated in two different time location and the same time location. In some implementations, the time location corresponding to each PUCCH can be a time slot, or the time location corresponding to each PUCCH can be OFDM symbols in a time slot. In some implementations, the PUCCH(s) corresponding to two spatial relationships can be allocated in two different frequency location and the same time location. In some implementations, the PUCCH(s) corresponding to two spatial relationships can be allocated in the same time and frequency location as well as related to two different CDM groups.

In some implementations, the parameter can be an identifier which used to initialize data scrambling (such as c_init) for the PUCCH(s) which configured with two spatial relationships. In some implementations, the PUCCH(s) corresponding to two spatial relationships can be the association between the values of the identifier and the two spatial relationships can be achieved by the first and the second values of the identifier are used to the first and the second spatial relationships, respectively; or, the first and the second values of the identifier are associated with the indicators of first and the second spatial relationships, respectively. In some implementations, the command which determines the parameters can be at least one of: RRC signalling MAC CE activation, or DCI indication.

In some implementations, the first communication node receives a command from the second communication node to determine the parameters of DM-RS for PUSCH(s), which are associated with SRS resources from two SRS resource sets indicated by a single DCI. In some implementations, the first communication node can be at least one of the UE, and the second communication node can be at least one of the NW or the gNB. In some implementations, the PUSCH can be transmitted by codebook based scheme or non-codebook based scheme. In some implementations, the PUSCH can be at least one of: PUSCH transmission, PUSCH repetition, or PUSCH occasion. In some implementations, the PUSCH(s) corresponding to two spatial relationships can be at least one of allocated in two different time location and the same time location. In some implementations, the time location corresponding to each PUSCH can be a time slot, or the time location corresponding to each PUSCH can be OFDM symbols in a time slot. In some implementations, the PUSCH(s) corresponding to two spatial relationships allocated in two different frequency location and the same time location. In some implementations, the PUSCH(s) corresponding to two spatial relationships allocated in the same time and frequency location as well as related to two different CDM groups.

In some implementations, the parameter can be an identifier which used to initialize data scrambling (such as c_init) of DM-RS for PUSCH which associated with the two SRS resource sets. In some implementations, the association between the values of the identifier and the two SRS resource sets can be achieved by the first and the second values of the identifier to the first and the second SRS resource sets, respectively, or, the first and the second values of the identifier associated with the indicators of first and the second SRS resource sets, respectively. In some implementations, the indicator of SRS resource set can be SRI(s) indication or TPMI(s) indication in DCI when higher layer parameter txConfig in PUSCH-Config is set to ‘codebook’. In some implementations, the indicator of SRS resource set can be SRI(s) indication in DCI when higher layer parameter txConfig in PUSCH-Config is set to ‘nonCodebook’. In some implementations, command determines the parameters can be at least one of: RRC signalling MAC CE activation, or DCI indication.

In some implementations, the first communication node receives a command from the second communication node to determine the parameters of PT-RS for PUSCH(s), which are associated with SRS resources from two SRS resource sets indicated by a single DCI. In some implementations, the first communication node can be at least one of the UE, and the second communication node can be at least one of the NW or the gNB. In some implementations, the PUSCH can be at least one of a PUSCH transmission, PUSCH repetition, or PUSCH occasion.

In some implementations, the PUSCH can be at least one of a PUSCH transmission, PUSCH repetition, or PUSCH occasion. In some implementations, the PUSCH(s) corresponding to two spatial relationships can be allocated in two different time location and the same time location. In some implementations, the time location corresponding to each PUSCH can be a time slot, or the time location corresponding to each PUSCH can be OFDM symbols in a time slot. In some implementations, the PUSCH(s) corresponding to two spatial relationships can be allocated in two different frequency location and the same time location. In some implementations, the PUSCH(s) corresponding to two spatial relationships can be allocated in the same time and frequency location as well as related to two different CDM groups.

In some implementations, the parameter can be an identifier which used to initialize data scrambling (such as c_init) of PT-RS for PUSCH which associated with the two SRS resource sets. In some implementations, the association between the values of the identifier and the two SRS resource sets can be achieved by the first and the second values of the identifier to the first and the second SRS resource sets, respectively; or, the first and the second values of the identifier associated with the indicators of the first and the second SRS resource sets, respectively. In some implementations, the indicator of SRS resource set can be SRI(s) indication or TPMI(s) indication in DCI when higher layer parameter txConfig in PUSCH-Config is set to ‘codebook’. In some implementations, the indicator of SRS resource set can be SRI(s) indication in DCI when higher layer parameter txConfig in PUSCH-Config is set to ‘nonCodebook’. In some implementations, the command determines the parameters can be at least one of: RRC signalling, MAC CE activation, or DCI indication.

In some implementations, the first communication node receives a command from the second communication node to determine the parameters of DM-RS for PUCCH(s), which are associated with SRS resources from two SRS resource sets indicated by a single DCI. In some implementations, the first communication node can be at least one of the UE, and the second communication node can be at least one of the NW or the gNB. In some implementations, the format of the PUCCH can be at least one of PUCCH format 0, PUCCH format 1, PUCCH format 2, PUCCH format 3, or PUCCH format 4. In some implementations, the PUCCH can be at least one of: PUCCH transmission, PUCCH repetition, or PUCCH occasion. In some implementations, the PUCCH(s) corresponding to two spatial relationships can be allocated in two different time location and the same time location. In some implementations, the time location corresponding to each PUCCH can be a time slot, or the time location corresponding to each PUCCH can be OFDM symbols in a time slot. In some implementations, the PUCCH(s) corresponding to two spatial relationships can be allocated in two different frequency location and the same time location. In some implementations, the PUCCH(s) corresponding to two spatial relationships can be allocated in the same time and frequency location as well as related to two different CDM groups.

In some implementations, the parameter can be an identifier which used to initialize data scrambling (such as c_init) of PT-RS for PUCCH(s) which configured with two different spatial relationships. In some implementations, the association between the values of the identifier and the two spatial relationships can be achieved by the first and the second values of the identifier to the first and the second spatial relationships, respectively, or, the first and the second values of the identifier associated with the indicators of first and the second spatial relationships, respectively. In some implementations, the command which determines the parameters can be at least one of RRC signalling, MAC CE activation, or DCI indication.

In some implementations, the first communication node receives a command from the second communication node to obtain the parameters of the PDSCH(s) associated with two configured CORESET pool indices. In some implementations, the first communication node can be at least one of the UE, and the second communication node can be at least one of the NW or the gNB. In some implementations, the PDSCH can be at least one of a PDSCH transmission, PDSCH repetition, or PDSCH occasion. In some implementations, the PDSCH(s) associated with two configured CORESET pool indices can be allocated in two different time location and the same time location. In some implementations, the time location corresponding to each PDSCH can be a time slot, or the time location corresponding to each PDSCH can be OFDM symbols in a time slot. In some implementations, the PDSCH(s) associated with two configured CORESET pool indices can be allocated in two different frequency location and the same time location. In some implementations, the PDSCH(s) associated with two configured CORESET pool indices can be allocated in the same time and frequency location as well as related to two different CDM groups.

In some implementations, the parameter can be an identifier which used to initialize data scrambling (such as c_init) for the PDSCH which associated with the two configured CORESET pool indices. In some implementations, the PDSCH(s) associated with two configured CORESET pool indices can be the association between the values of the identifier and the two configured CORESET pool indices can be achieved by the first and the second values of the identifier to the first and the second SRS resource sets, respectively, or, the first and the second values of the identifier associated with the indicators of first and the second configured CORESET pool indices, respectively. In some implementations, the command determines the parameters can be at least one of: RRC signalling, MAC CE activation, or DCI indication.

In some implementations, the first communication node receives a command from the second communication node to obtain the parameters of the PDCCH(s) associated with two configured CORESET pool indices. In some implementations, the first communication node can be at least one of the UE, and the second communication node can be at least one of the NW or the gNB. In some implementations, the PDCCH can be at least one of a PDCCH transmission, PDCCH repetition, or PDCCH occasion. In some implementations, the PDCCH(s) associated with two configured CORESET pool indices can be allocated in two different time location and the same time location. In some implementations, the time location corresponding to each PDCCH can be a time slot, or the time location corresponding to each PDCCH can be OFDM symbols in a time slot. In some implementations, the PDCCH(s) associated with two configured CORESET pool indices can be allocated in two different frequency location and the same time location. In some implementations, the PDCCH(s) associated with two configured CORESET pool indices can be allocated in the same time and frequency location as well as related to two different CDM groups.

In some implementations, the parameter can be an identifier which used to initialize data scrambling (such as c_init) for the PDCCH which associated with the two configured CORESET pool indices. In some implementations, the association between the values of the identifier and the two configured CORESET pool indices can be achieved by, the first and the second values of the identifier to the first and the second SRS resource sets, respectively, or, the first and the second values of the identifier are associated with the indicators of first and the second configured CORESET pool indices, respectively. In some implementations, the command determines the parameters can be at least one of: RRC signalling, MAC CE activation, or DCI indication.

In some implementations, the first communication node receives command from the second communication node to determine the parameters of DM-RS for PDSCH(s) associated with two configured CORESET pool indices. In some implementations, the first communication node can be at least one of the UE, and the second communication node can be at least one of the NW or the gNB.

In some implementations, the PDSCH can be at least one of: PDSCH transmission, PDSCH repetition, or PDSCH occasion. In some implementations, the PDSCH(s) associated with two configured CORESET pool indices can be allocated in two different time location and the same time location. In some implementations, the time location corresponding to each PDSCH can be a time slot, or the time location corresponding to each PDSCH can be OFDM symbols in a time slot. In some implementations, the PDSCH(s) associated with two configured CORESET pool indices can be allocated in two different frequency location and the same time location. In some implementations, the PDSCH(s) associated with two configured CORESET pool indices can be allocated in the same time and frequency location as well as related to two different CDM groups.

In some implementations, the parameter can be an identifier which used to initialize data scrambling (such as c_init) of DM-RS for PDSCH which associated with the two configured CORESET pool indices. In some implementations, the association between the values of the identifier and the two configured CORESET pool indices can be achieved by the first and the second values of the identifier to the first and the second SRS resource sets, respectively, or, the first and the second values of the identifier are associated with the indicators of first and the second configured CORESET pool indices, respectively. In some implementations, the command determines the parameters can be at least one of: RRC signalling, MAC CE activation, or DCI indication.

In some implementations, the first communication node receives a command from the second communication node to determine the parameters of PT-RS for PDSCH(s) associated with two configured CORESET pool indices. In some implementations, the first communication node can be at least one of the UE, and the second communication node can be at least one of the NW or the gNB. In some implementations, the PDSCH can be at least one of a PDSCH transmission, PDSCH repetition, or PDSCH occasion. In some implementations, the PDSCH(s) associated with two configured CORESET pool indices can be allocated in two different time location and the same time location. In some implementations, the time location corresponding to each PDSCH can be a time slot, or the time location corresponding to each PDSCH can be OFDM symbols in a time slot. In some implementations, the PDSCH(s) associated with two configured CORESET pool indices can be allocated in two different frequency location and the same time location. In some implementations, the PDSCH(s) associated with two configured CORESET pool indices can be allocated in the same time and frequency location as well as related to two different CDM groups.

In some implementations, the parameter can be an identifier which used to initialize data scrambling (such as c_init) of PT-RS for PDSCH which associated with the two configured CORESET pool indices. In some implementations, the association between the values of the identifier and the two configured CORESET pool indices can be achieved by the first and the second values of the identifier are used to the first and the second SRS resource sets, respectively, or, the first and the second values of the identifier are associated with the indicators of first and the second configured CORESET pool indices, respectively. In some implementations, the command determines the parameters can be at least one of: RRC signalling, MAC CE activation, or DCI indication.

In some implementations, the first communication node receives a command from the second communication node to determine the parameters of DM-RS for PDCCH(s) associated with two configured CORESET pool indices. In some implementations, the first communication node can be at least one of the UE, and the second communication node can be at least one of the NW or the gNB.

In some implementations, the PDCCH can be at least one of: PDCCH transmission, PDCCH repetition, or PDCCH occasion. In some implementations, the PDCCH(s) associated with two configured CORESET pool indices can be allocated in two different time location and the same time location. In some implementations, the time location corresponding to each PDCCH can be a time slot, or the time location corresponding to each PDCCH can be OFDM symbols in a time slot. In some implementations, the PDCCH(s) associated with two configured CORESET pool indices can be allocated in two different frequency location and the same time location. In some implementations, the PDCCH(s) associated with two configured CORESET pool indices can be allocated in the same time and frequency location as well as related to two different CDM groups. In some implementations, the parameter can be an identifier which used to initialize data scrambling (such as c_init) of DM-RS for PDCCH which associated with the two SRS resource sets. In some implementations, the command determines the parameters can be at least one of: RRC signalling, MAC CE activation, or DCI indication.

In some implementations, the first communication node receives a command from the second communication node to determine the parameters of CSI-RS(s) associated with two configured CORESET pool indices. In some implementations, the first communication node can be at least one of the UE, and the second communication node can be at least one of the NW or the gNB.

In some implementations, the CSI-RS can be at least one of: CSI-RS transmission, CSI-RS repetition, or CSI-RS occasion. In some implementations, the CSI-RS(s) associated with two configured CORESET pool indices can be allocated in two different time location and the same time location. In some implementations, the time location corresponding to each CSI-RS can be a time slot, or the time location corresponding to each CSI-RS can be OFDM symbols in a time slot. In some implementations, the CSI-RS(s) associated with two configured CORESET pool indices can be allocated in two different frequency location and the same time location. In some implementations, the CSI-RS(s) associated with two configured CORESET pool indices can be allocated in the same time and frequency location as well as related to two different CDM groups.

In some implementations, the parameter can be an identifier which used to initialite data scrambling (such as c_init) of CSI-RS(s) which can be associated with the two configured CORESET pool indices. In some implementations, the association between the values of the identifier and the two configured CORESET pool indices can be achieved by the first and the second values of the identifier used to the first and the second SRS resource sets, respectively, or, the first and the second values of the identifier associated with the indicators of first and the second configured CORESET pool indices, respectively. In some implementations, the command determines the parameters can be at least one of: RRC signalling, MAC CE activation, or DCI indication.

Figure 5:
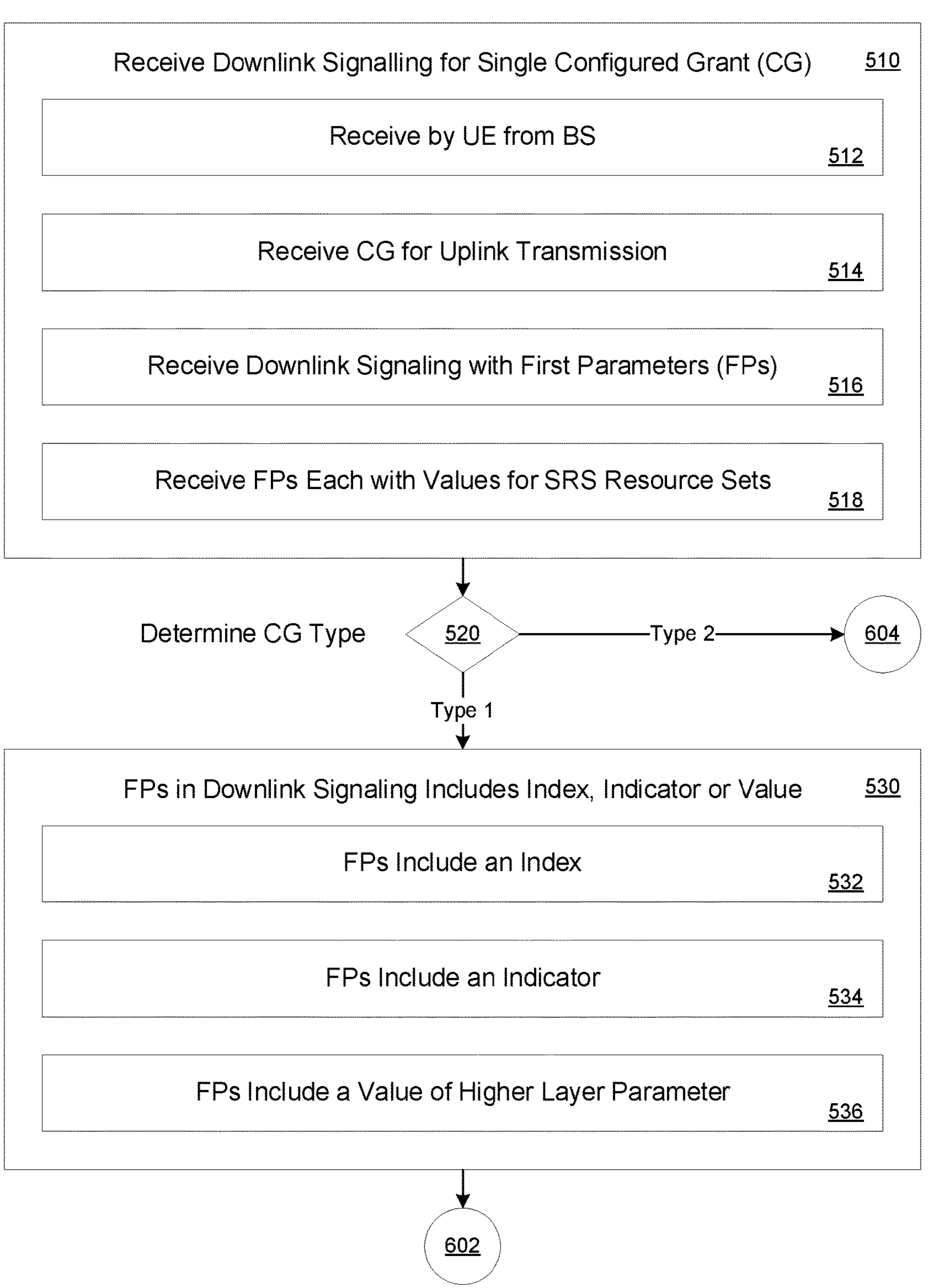
FIG. 5 illustrates an example method of single CG-based uplink transmission in multi-TRP operation, in accordance with present implementations.

FIG. 5 illustrates an example method of single CG-based uplink transmission in multi-TRP operation, in accordance with present implementations. In some implementations, at least one of the example systems 100 and 200 performs method 500 according to present implementations. In some implementations, the method 500 begins at step 510.

At step 510, the example system receives downlink signalling for a single configured grant (CG). In some implementations, step 510 includes at least one of steps 512, 514, 516 and 518. At step 512, the example system receives the downlink signalling by a UE from a BS. At step 514, the example system receives the CG for uplink transmission. At step 516, the example system receives downlink signalling with a plurality of first parameters. At step 518, the example system receives the first parameters each with values for SRS resource sets. The method 500 then continues to step 520.

At step 520, the example system determines whether the CG is of a first type (Type 1) or a second type (Type 2). In accordance with a determination that the CG is of a first type, the method 500 continues to step 530. Alternatively, in accordance with a determination that the CG is of a second type, the method 500 continues to step 604.

At step 530, the example system has first parameters in the downlink signalling including at least one of an index, an indicator, and a value. In some implementations, step 530 includes at least one of steps 532, 534 and 536. At step 532, the example system has first parameters including at least one index. At step 534, the example system has first parameters including at least one indicator. At step 536, the example system has first parameters including at least one value of a higher layer parameter. The method 500 then continues to step 602.

Figure 6:
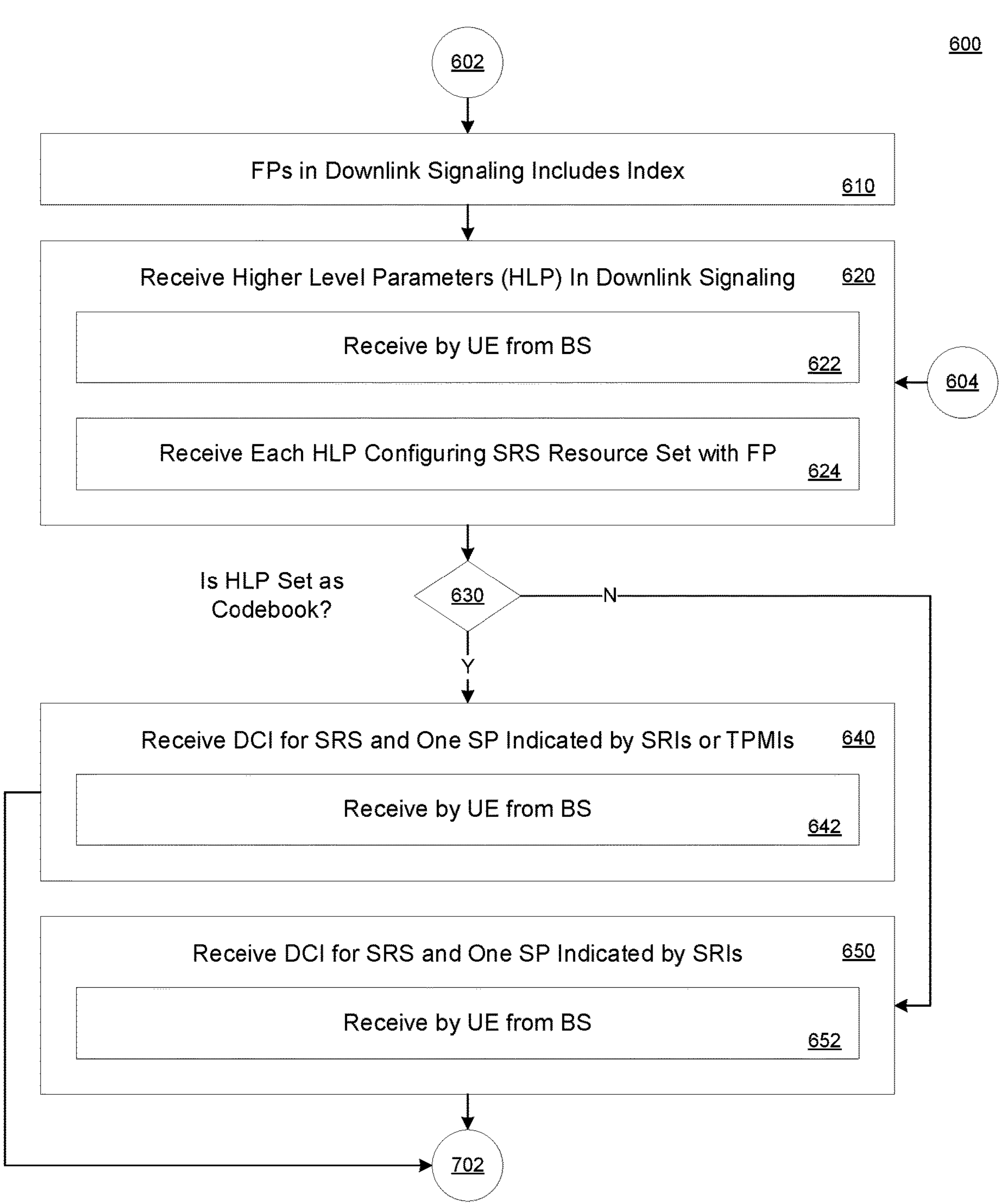
FIG. 6 illustrates an example method of single CG-based uplink transmission in multi-TRP operation further to the example method of FIG. 5.

FIG. 6 illustrates an example method of single CG-based uplink transmission in multi-TRP operation further to the example method of FIG. 5. In some implementations, at least one of the example systems 100 and 200 performs method 600 according to present implementations. In some implementations, the method 600 begins at step 602. The method 600 then continues to step 610.

At step 610, the example system has first parameters in the downlink signalling including an index. The method 600 then continues to step 604. At step 604, the method 600 then continues to step 620.

At step 620, the example system receives higher level parameters in downlink signalling. In some implementations, higher level parameters are or include rrc-ConfiguredUplinkGrant. In some implementations, step 620 includes at least one of steps 622 and 624. At step 622, the example system receives by a UE from a BS. At step 624, the example system receives each HLP configuring associations for an SRS resource set and first parameters. The method 600 then continues to step 630.

At step 630, the example system determines whether the high level parameter is set as codebook. In accordance with a determination that the high level parameter is set as codebook, the method 600 continues to step 640. Alternatively, in accordance with a determination that the high level parameter is not set as codebook, the method 600 continues to step 650.

At step 640, the example system receives downlink control information (DCI) for SRS and one second parameter indicated by at least one of one or more SRIs or one or more TPMIs. In some implementations, step 640 includes step 642. At step 642, the example system receives by a UE from a BS. The method 600 then continues to step 702.

At step 650, the example system receives downlink control information (DCI) for SRS and one second parameter indicated by one or more SRIs. In some implementations, step 650 includes step 652. At step 652, the example system receives by a UE from a BS. The method 600 then continues to step 702.

Figure 7:
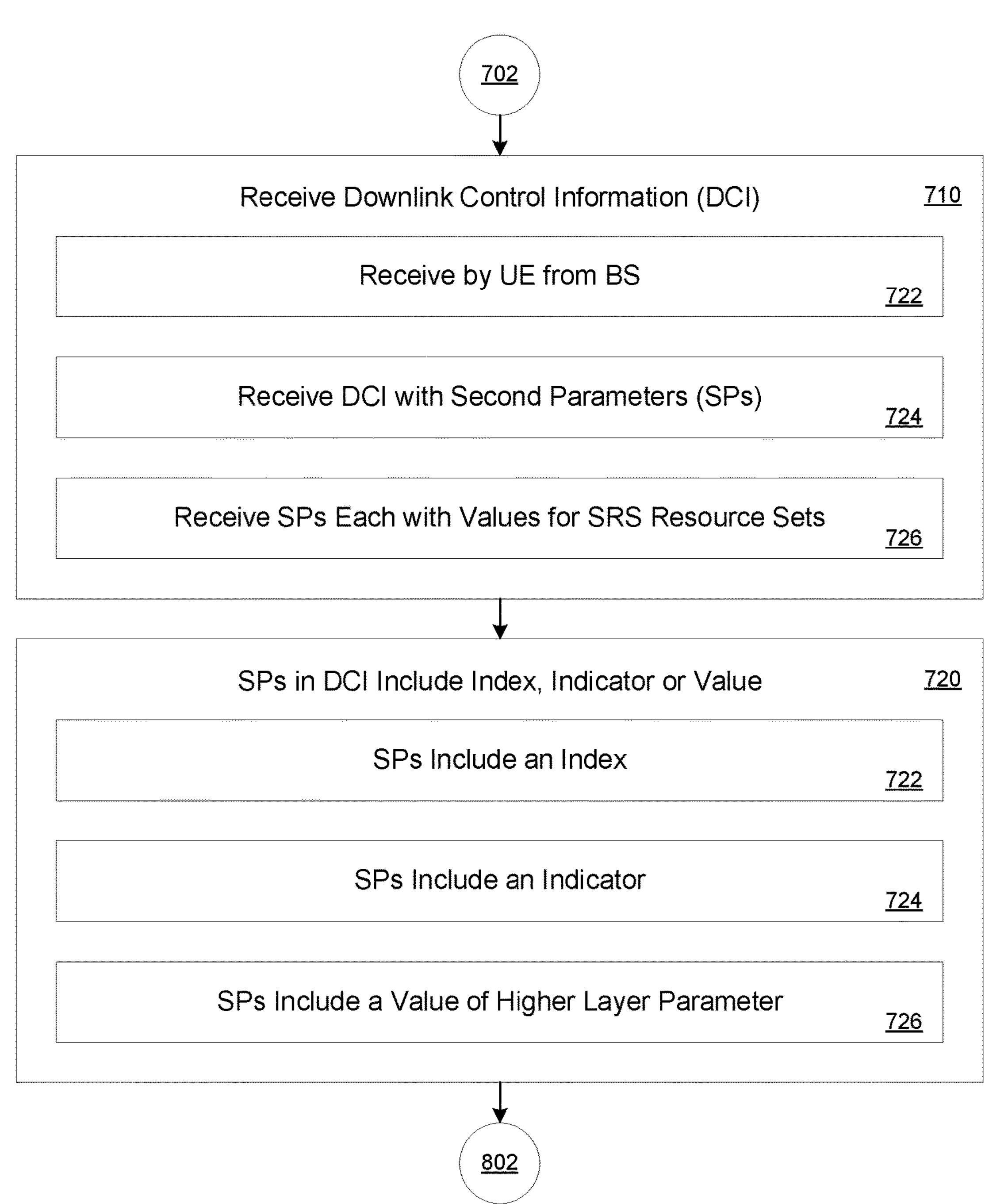
FIG. 7 illustrates an example method of single CG-based uplink transmission in multi-TRP operation further to the example method of FIG. 6.

FIG. 7 illustrates an example method of single CG-based uplink transmission in multi-TRP operation further to the example method of FIG. 6. In some implementations, at least one of the example systems 100 and 200 performs method 700 according to present implementations. In some implementations, the method 700 begins at step 702. The method 700 then continues to step 710.

At step 710, the example system receives downlink control information (DCI). In some implementations, step 710 includes at least one of steps 712, 714 and 716. At step 712, the example system receives the DCI by a UE from a BS. At step 714, the example system receives the DCI with a plurality of second parameters. At step 716, the example system receives second parameters each with values for SRS resource sets. The method 700 then continues to step 720.

At step 720, the example system has second parameters in a DCI including at least one of an index, an indicator, and a value. In some implementations, step 720 includes at least one of steps 722, 724 and 726. At step 722, the example system has second parameters including at least one index. At step 724, the example system has second parameters including at least one indicator. At step 726, the example system has second parameters including at least one value of a higher layer parameter. The method 700 then continues to step 802.

FIG. 8 illustrates an example method of single CG-based uplink transmission in multi-TRP operation further to the example method of FIG. 7. In some implementations, at least one of the example systems 100 and 200 performs method 800 according to present implementations. In some implementations, the method 800 begins at step 802. The method 800 then continues to step 810.

At step 810, the example system sends an uplink transmission based on an indicated CG. In some implementations, step 810 includes at least one of steps 812, 814, 816 and 818. At step 812, the example system sends the uplink transmission by a UE to a BS. At step 814, the example system sends the uplink transmission by a PUSCH transmission. At step 816, the example system sends the uplink transmission by a PUSCH repetition. At step 818, the example system sends the uplink transmission by a PUSCH occasion. The method 800 then continues to step 820.

At step 820, the example system receives a single DCI indicating SRS resource sets. In some implementations, step 820 includes at least one of steps 822, 824 and 826. At step 822, the example system receives the DCI by a US from a BS. At step 824, the example system receives the DCI in DCI Format 0_1. At step 826, the example system receives the DCI in DCI Format 0_2. The method 800 then continues to step 902.

Figure 9:
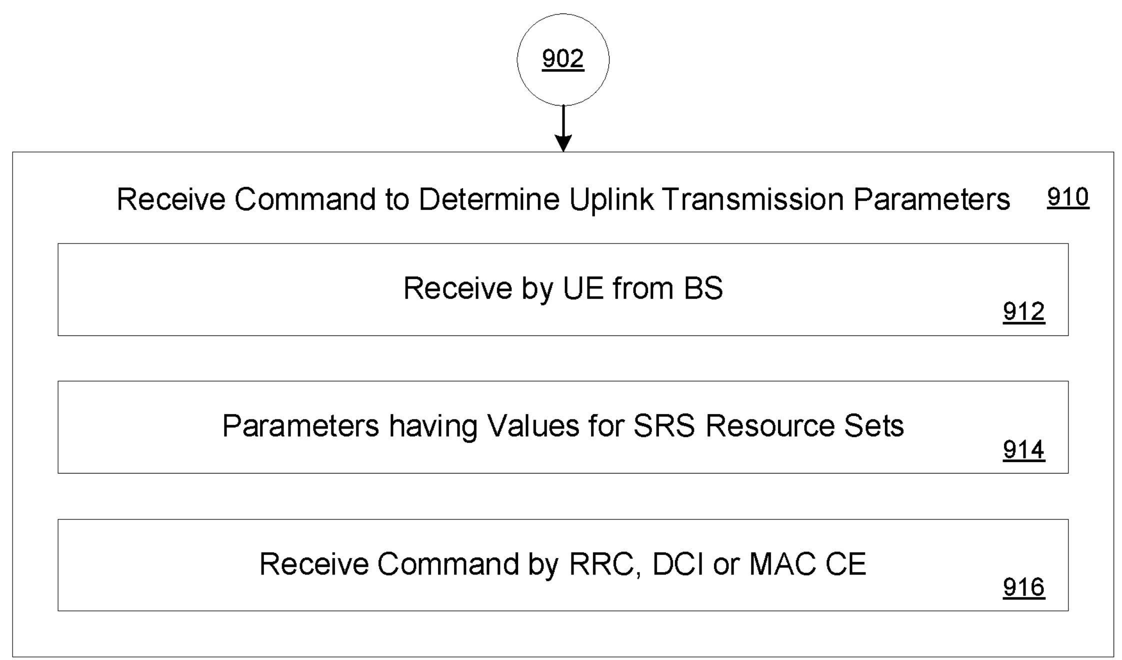
FIG. 9 illustrates an example method of single CG-based uplink transmission in multi-TRP operation further to the example method of FIG. 8.

FIG. 9 illustrates an example method of single CG-based uplink transmission in multi-TRP operation further to the example method of FIG. 8. In some implementations, at least one of the example systems 100 and 200 performs method 900 according to present implementations. In some implementations, the method 900 begins at step 902. The method 900 then continues to step 910.

At step 910, the example system receives a command to determine uplink transmission parameters. In some implementations, step 910 includes at least one of steps 912, 914 and 916. At step 912, the example system receives the command by a UE from a BS. At step 914, the example system has parameters having values for SRS resource sets. At step 916, the example system receives the command by at least one of RRC signalling, DCI indication, or MAC CE activation. In some implementations, the method 900 ends at step 910.

Figure 10:
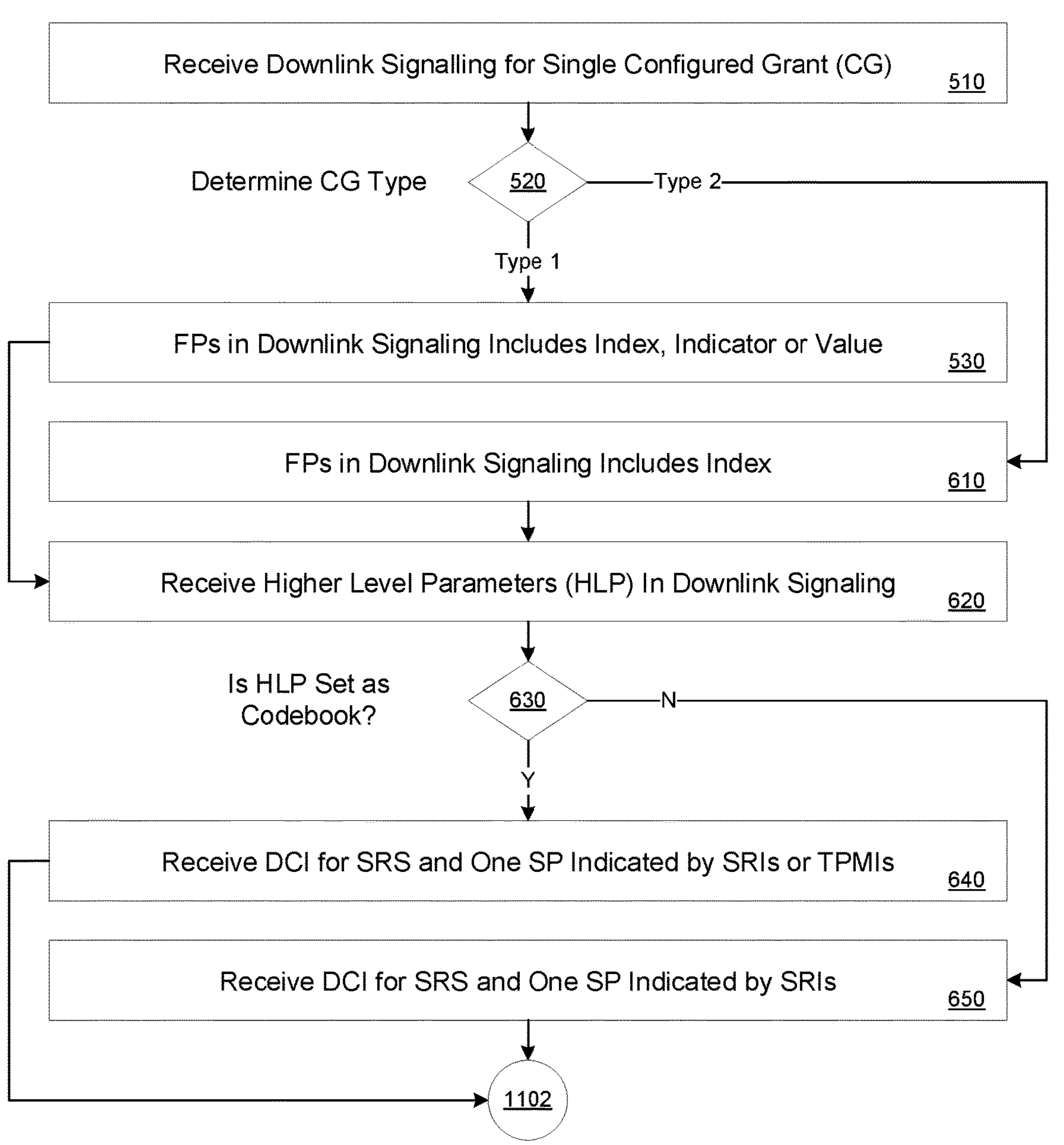
FIG. 10 illustrates a further example method of single CG-based uplink transmission in multi-TRP operation, in accordance with present implementations.

FIG. 10 illustrates a further example method of single CG-based uplink transmission in multi-TRP operation, in accordance with present implementations. In some implementations, at least one of the example systems 100 and 200 performs method 1000 according to present implementations. In some implementations, the method 1000 begins at step 510.

At step 510, the example system receives downlink signalling for a single configured grant (CG). The method 1000 then continues to step 520. At step 520, the example system determines whether the CG is of a first type (Type 1) or a second type (Type 2). In accordance with a determination that the CG is of a first type, the method 1000 continues to step 530. Alternatively, in accordance with a determination that the CG is of a second type, the method 1000 continues to step 610. At step 530, the example system has first parameters in the downlink signalling including at least one of an index, an indicator, and a value. The method 1000 then continues to step 620. At step 610, the example system has first parameters in the downlink signalling including an index. The method 1000 then continues to step 620.

At step 620, the example system receives higher level parameters in downlink signalling. The method 1000 then continues to step 630. At step 630, the example system determines whether the high level parameter is set as codebook. In accordance with a determination that the high level parameter is set as codebook, the method 1000 continues to step 640. Alternatively, in accordance with a determination that the high level parameter is not set as codebook, the method 600 continues to step 650.

At step 640, the example system receives downlink control information (DCI) for SRS and one second parameter indicated by at least one of one or more SRIs or one or more TPMIs. The method 1000 then continues to step 1102.

At step 650, the example system receives downlink control information (DCI) for SRS and one second parameter indicated by one or more SRIs. The method 1000 then continues to step 1102.

Figure 11:
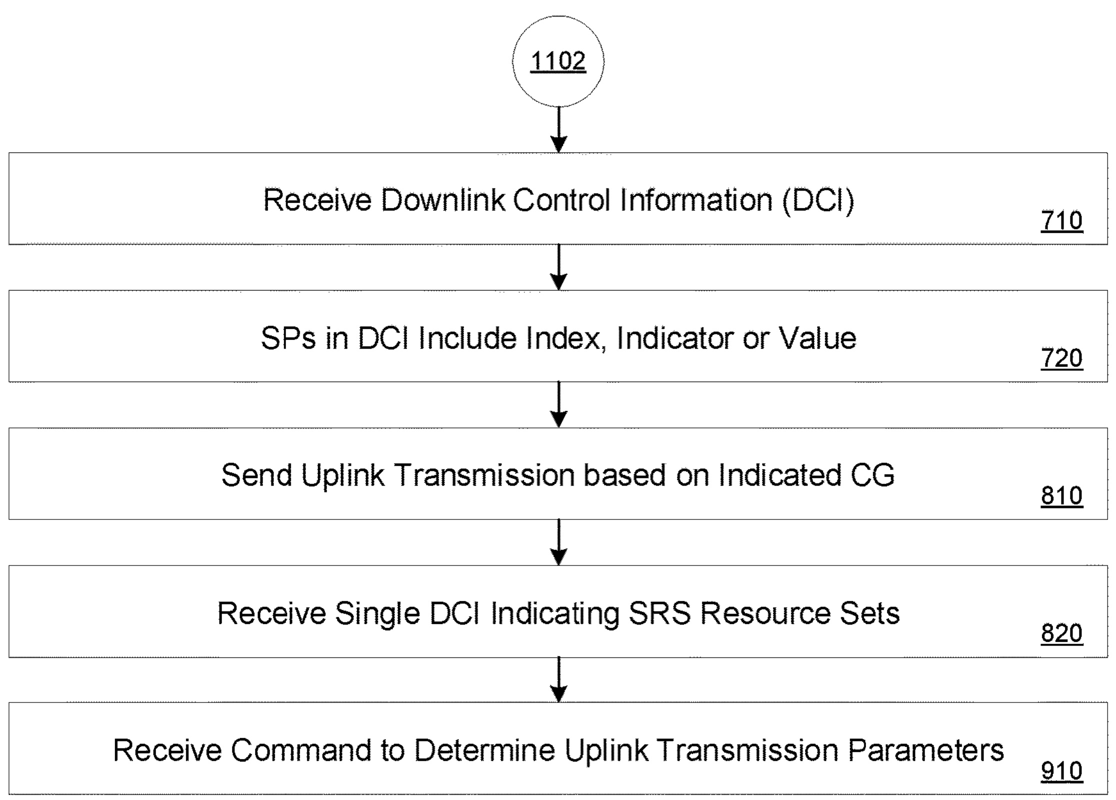
FIG. 11 illustrates a further example method of single CG-based uplink transmission in multi-TRP operation further to the example method of FIG. 10.

FIG. 11 illustrates a further example method of single CG-based uplink transmission in multi-TRP operation further to the example method of FIG. 10. In some implementations, at least one of the example systems 100 and 200 performs method 1100 according to present implementations. In some implementations, the method 1100 begins at step 710.

At step 710, the example system receives downlink control information (DCI). The method 1100 then continues to step 720. At step 720, the example system has second parameters in a DCI including at least one of an index, an indicator, and a value. The method 1100 then continues to step 810.

At step 810, the example system sends an uplink transmission based on an indicated CG. The method 1100 then continues to step 820. At step 820, the example system receives a single DCI indicating SRS resource sets. The method 1100 then continues to step 910. At step 910, the example system receives a command to determine uplink transmission parameters. In some implementations, the method 1100 ends at step 910.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

The invention claimed is:

1. A wireless communication method, comprising:

receiving, by a wireless communication device from a wireless communication node, a downlink signaling indicating a single Configured Grant (CG) for an uplink transmission;

wherein the downlink signaling comprises a plurality of first parameters, each first parameter having a plurality of values associated with a respective plurality of Sounding Reference Signal (SRS) resource sets, and wherein, for each of the plurality of first parameters, the downlink signaling configures an association between each of the SRS resource sets and a respective one of the values of the first parameter, such that the single CG configures a mapping for each value of the first parameter of the plurality of first parameters, to a respective SRS resource set of the plurality of SRS resource sets.

2. The wireless communication method of claim 1, wherein the downlink signaling includes a Radio Resource Control (RRC) signaling.

3. The wireless communication method of claim 1, wherein when the CG is a Type 1 CG, the plurality of first parameters, in the downlink signaling, include at least one of:

an index of power control closed loop;

an index of a higher layer parameter, PO-PUSCH-AlphaSet, an index of path loss reference signal;

an indicator of one SRS resource per one of the SRS resource sets;

an indicator of precoding information and a number of layers;

a value of a higher layer parameter, dmrs-SeqInitialization, or a value of a higher layer parameter, antennaPort.

4. The wireless communication method of claim 1, wherein the downlink signaling configures the association between each of the SRS resource sets and a respective one of the values of the first parameter.

5. The wireless communication method of claim 1, wherein when the CG is a Type 2 CG, the plurality of first parameters, in the downlink signaling, include at least one of:

an index of power control closed loop; or an index of a higher layer parameter, PO-PUSCH-AlphaSet.

6. A wireless communication method, comprising:

sending, by a wireless communication node to a wireless communication device, a downlink signaling indicating a single Configured Grant (CG) for an uplink transmission;

wherein the downlink signaling comprises a plurality of first parameters, each first parameter having a plurality of values associated with a respective plurality of Sounding Reference Signal (SRS) resource sets, and wherein, for each of the plurality of first parameters, the downlink signaling configures an association between each of the SRS resource sets and a respective one of the values of the first parameter, such that the single CG configures a mapping for each value of the first parameter of the plurality of first parameters, to a respective SRS resource set of the plurality of SRS resource sets.

7. The wireless communication method of claim 6, wherein the downlink signaling includes a Radio Resource Control (RRC) signaling.

8. The wireless communication method of claim 6, wherein when the CG is a Type 1 CG, the plurality of first parameters, in the downlink signaling, include at least one of:

an index of power control closed loop;

an index of a higher layer parameter, PO-PUSCH-AlphaSet, an index of path loss reference signal;

an indicator of one SRS resource per one of the SRS resource sets;

an indicator of precoding information and a number of layers;

a value of a higher layer parameter, dmrs-SeqInitialization; or a value of a higher layer parameter, antennaPort.

9. The wireless communication method of claim 6, wherein the downlink signaling configures the association between each of the SRS resource sets and a respective one of the values of the first parameter.

10. The wireless communication method of claim 6, wherein when the CG is a Type 2 CG, the plurality of first parameters, in the downlink signaling, include at least one of:

an index of power control closed loop; or an index of a higher layer parameter, PO-PUSCH-AlphaSet.

11. A wireless communication device, comprising:

at least one processor and a receiver configured to:

receive, from a wireless communication node, a downlink signaling indicating a single Configured Grant (CG) for an uplink transmission;

wherein the downlink signaling comprises a plurality of first parameters, each first parameter having a plurality of values associated with a respective plurality of Sounding Reference Signal (SRS) resource sets, and wherein, for each of the plurality of first parameters, the downlink signaling configures an association between each of the SRS resource sets and a respective one of the values of the first parameter, such that the single CG configures a mapping for each value of the first parameter of the plurality of first parameters, to a respective SRS resource set of the plurality of SRS resource sets.

12. The wireless communication device of claim 11, wherein the downlink signaling includes a Radio Resource Control (RRC) signaling.

13. The wireless communication device of claim 11, wherein when the CG is a Type 1 CG, the plurality of first parameters, in the downlink signaling, include at least one of:

an index of power control closed loop;

an index of a higher layer parameter, PO-PUSCH-AlphaSet, an index of path loss reference signal;

an indicator of one SRS resource per one of the SRS resource sets;

an indicator of precoding information and a number of layers;

a value of a higher layer parameter, dmrs-SeqInitialization; or a value of a higher layer parameter, antennaPort.

14. The wireless communication device of claim 11, wherein the downlink signaling configures the association between each of the SRS resource sets and a respective one of the values of the first parameter.

15. The wireless communication device of claim 11, wherein when the CG is a Type 2 CG, the plurality of first parameters, in the downlink signaling, include at least one of:

an index of closed loop power control; or an index of a higher layer parameter, PO-PUSCH-AlphaSet.

16. A wireless communication node, comprising:

at least one processor and a transmitter, configured to:

send, via the transmitter to a wireless communication device, a downlink signaling indicating a single Configured Grant (CG) for an uplink transmission;

wherein the downlink signaling comprises a plurality of first parameters, each first parameter having a plurality of values associated with a respective plurality of Sounding Reference Signal (SRS) resource sets, and wherein, for each of the plurality of first parameters, the downlink signaling configures an association between each of the SRS resource sets and a respective one of the values of the first parameter, such that the single CG configures a mapping for each value of the first parameter of the plurality of first parameters, to a respective SRS resource set of the plurality of SRS resource sets.

17. The wireless communication node of claim 16, wherein the downlink signaling includes a Radio Resource Control (RRC) signaling.

18. The wireless communication node of claim 16, wherein when the CG is a Type 1 CG, the plurality of first parameters, in the downlink signaling, include at least one of:

an index of power control closed loop;

an index of a higher layer parameter, PO-PUSCH-AlphaSet, an index of path loss reference signal;

an indicator of one SRS resource per one of the SRS resource sets;

an indicator of precoding information and a number of layers;

a value of a higher layer parameter, dmrs-SeqInitialization, or a value of a higher layer parameter, antennaPort.

19. The wireless communication node of claim 16, wherein the downlink signaling configures the association between each of the SRS resource sets and a respective one of the values of the first parameter.

20. The wireless communication node of claim 16, wherein when the CG is a Type 2 CG, the plurality of first parameters, in the downlink signaling, include at least one of:

an index of closed loop power control; or an index of a higher layer parameter, PO-PUSCH-AlphaSet.

* * * * *